(12) United States Patent
Guen (10) Patent No.: US 9,887,412 B2
(45) Date of Patent: Feb. 6, 2018

(54) RECHARGEABLE BATTERY HAVING UPPER INSULATOR MEMBER

(71) Applicant: SAMSUNG SDI CO., LTD., Yongin-si, Gyeonggi-do (KR)

(72) Inventor: Min-Hyung Guen, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 240 days.

(21) Appl. No.: 14/841,935

(22) Filed: Sep. 1, 2015

(65) Prior Publication Data

US 2016/0260959 A1 Sep. 8, 2016

(30) Foreign Application Priority Data

Mar. 3, 2015 (KR) .......................... 10-2015-0030013

(51) Int. Cl.
*H01M 2/30* (2006.01)
*H01M 2/34* (2006.01)
*H01M 2/02* (2006.01)
*H01M 2/04* (2006.01)

(52) U.S. Cl.
CPC ......... *H01M 2/345* (2013.01); *H01M 2/0237* (2013.01); *H01M 2/043* (2013.01); *H01M 2/30* (2013.01); *H01M 2200/20* (2013.01); *H01M 2220/20* (2013.01)

(58) Field of Classification Search
CPC .......... H01M 2/34; H01M 2/345; H01M 2/30; H01M 2200/20

USPC .......................................................... 429/61
See application file for complete search history.

(56) References Cited

U.S. PATENT DOCUMENTS

2013/0330581 A1* 12/2013 Kim ...................... H01M 2/345
429/61

FOREIGN PATENT DOCUMENTS

JP  2011-117466  6/2011
JP  2012-128961  7/2012

* cited by examiner

*Primary Examiner* — James Lee
(74) *Attorney, Agent, or Firm* — Lee & Morse, P.C.

(57) ABSTRACT

A rechargeable battery includes an electrode assembly including a first electrode and a second electrode, a case to receive the electrode assembly, a cap plate coupled with the case and including a short circuit hole, a first terminal electrically connected to the first electrode, a second terminal electrically connected to the second electrode, an upper insulator member disposed between the second terminal and the cap plate, the upper insulator member having a connection hole communicating with the short circuit hole, and a terminal hole spaced apart from the connection hole, a short circuit member in the short circuit hole to electrically connect the cap plate with the second terminal when the short circuit member is modified, and a gap between the upper insulator member and the cap plate, the gap extending continuously from the connection hole toward the terminal hole.

17 Claims, 10 Drawing Sheets

RECHARGEABLE BATTERY HAVING UPPER INSULATOR MEMBER

CROSS-REFERENCE TO RELATED APPLICATION

Korean Patent Application No. 10-2015-0030013, filed on Mar. 3, 2015, in the Korean Intellectual Property Office, and entitled: "Rechargeable Battery Having Upper Insulator Member," is incorporated by reference herein in its entirety.

BACKGROUND

1. Field

The present disclosure relates to a rechargeable battery. More particularly, the present disclosure relates to a rechargeable battery having an upper insulator member.

2. Description of the Related Art

Unlike a primary battery that is incapable of being recharged, a rechargeable battery can be repeatedly charged and discharged. A low capacity rechargeable battery has been used in small portable electronic devices, e.g., a mobile phone or a laptop computer and camcorder, and a large portable capacity battery has been used as a power supply, e.g., for operating a motor or a large capacity storage device of a hybrid vehicle or the like.

In recent years, a high power rechargeable battery using a non-aqueous electrolyte having a high energy density has been developed. The above high power rechargeable battery is configured by a large capacity battery module by connecting a plurality of rechargeable batteries to each other in series to be used to drive a motor of a device requiring a large amount of power, e.g., an electric vehicle. For example, one large capacity rechargeable battery module includes a plurality of rechargeable batteries which are connected to each other in series, and each rechargeable battery may have a cylindrical or square shape.

The above information disclosed in this Background section is only for enhancement of understanding of the background and therefore it may contain information that does not form the prior art that is already known in this country to a person of ordinary skill in the art.

SUMMARY

An exemplary embodiment provides a rechargeable battery including an electrode assembly including a first electrode and a second electrode, a case to receive the electrode assembly, a cap plate coupled with the case and including a short circuit hole, a first terminal electrically connected to the first electrode, a second terminal electrically connected to the second electrode, an upper insulator member disposed between the second terminal and the cap plate, the upper insulator member having a connection hole communicating with the short circuit hole, and a terminal hole spaced apart from the connection hole, a short circuit member in the short circuit hole to electrically connect the cap plate with the second terminal when the short circuit member is modified, and a gap between the upper insulator member and the cap plate, the gap extending continuously from the connection hole toward the terminal hole.

The gap may communicate with the terminal hole but may not communicate with the connection hole. An exhaust groove may be formed in a plane toward the cap plate in the upper insulator member.

The exhaust groove may be spaced apart from the connection hole the terminal and may be connected to the terminal hole. The exhaust groove may be curved to have an arc shape.

The exhaust groove may be continuously formed from one end of the upper insulation member to an opposite end of the upper insulator member. The upper insulator member may be formed therein with an air hole spaced apart from the connection hole, and the gap may communicate with the air hole.

An upper gasket may be installed between the upper insulator member and the second terminal, and the upper gasket may simultaneously surround a top end of the air hole and a top end of the connection hole.

The upper gasket may include: an upper sealing part to partially surround a circumference of the connection hole; and a connection sealing therein with both ends connected to the upper sealing part, and protruding toward the air hole to surround a circumference of the air hole.

The support plate extending to an outer side of the upper gasket may be connected to the upper sealing part, and the support plate may protrude in a direction opposite to a direction toward the connection sealing part.

A lower gasket may be installed between the upper insulator member and the short circuit member, and the lower gasket may surround the connection hole. The lower sealing part may have a ring shape and may surround the connection hole to block communication between the connection hole and the air hole.

The lower gasket may include a guide protrusion protruding toward the air hole from the lower sealing part, and the guide protrusion may partially surround the air hole.

A guide plate bonded to the guide protrusion and the lower sealing part may be formed at an inner side of the guide protrusion, and the guide plate may be formed therein with a guide hole communicating with the air hole. The gap may have a maximum height in a range of 0.5 mm to 2 mm.

The rechargeable battery may further include a first terminal electrically connected to the first electrode and protruding to an outer side of the cap plate, wherein the first terminal may be electrically connected to a cap plate through a medium of a connecting plate, and the short circuit member may be electrically connected to the second terminal through a medium of the cap plate. The short circuit member may include: a curve part which is convexly bent downward; and an edge part formed at an outer side of the curve part.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
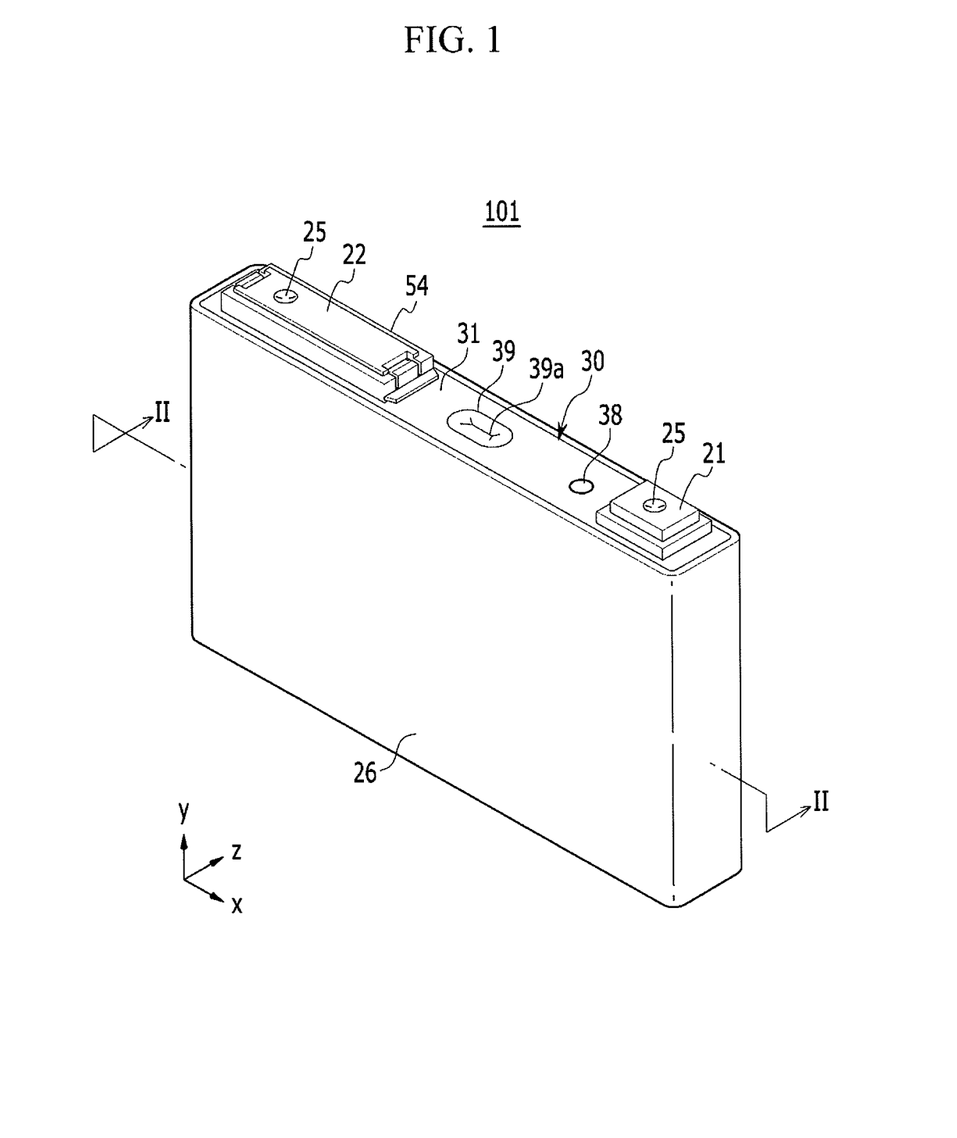
FIG. 1 illustrates a perspective view of a rechargeable battery according to an exemplary embodiment.
Figure 2:
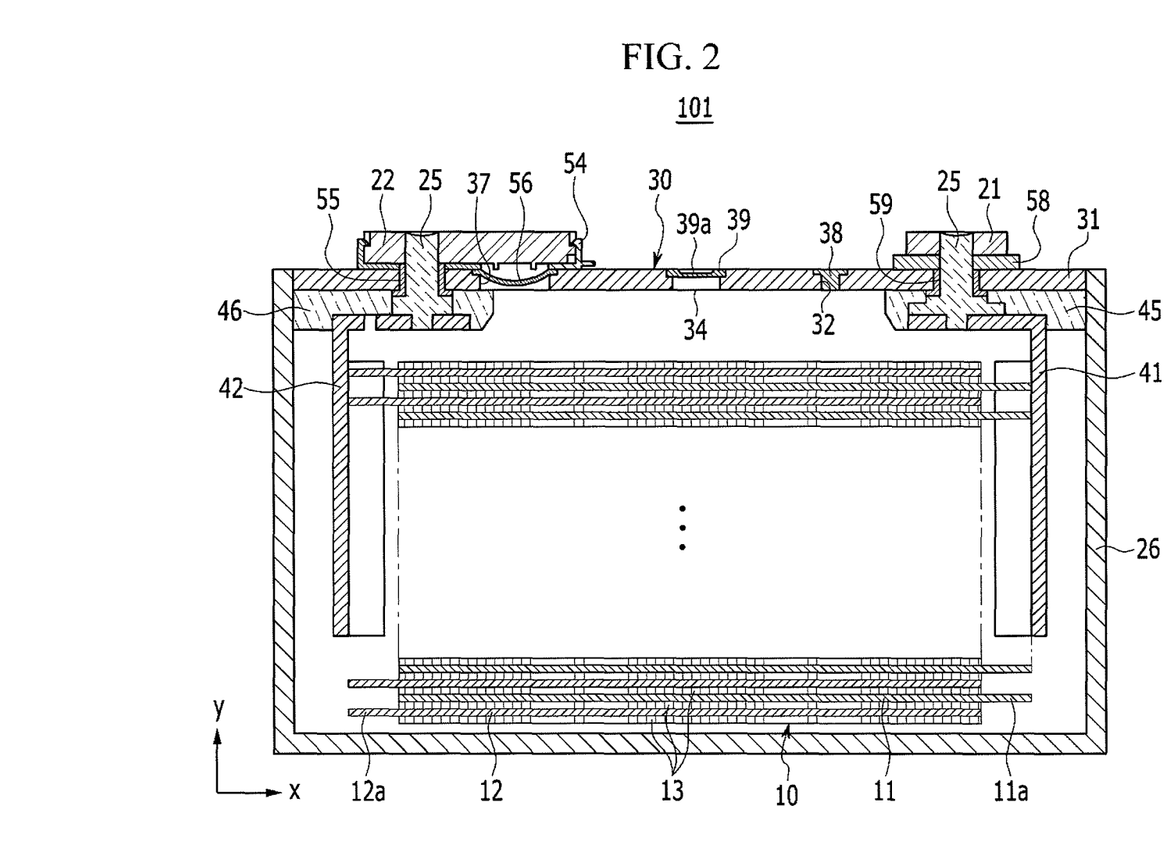
FIG. 2 illustrates a cross-sectional view taken along line II-II of FIG. 1.

FIG. 1 is a perspective view illustrating a rechargeable battery according to an exemplary embodiment, and FIG. 2 is a cross-sectional view along line II-II of FIG. 1.

Referring to FIG. 1 and FIG. 2, a rechargeable battery 101 according to an exemplary embodiment includes an electrode assembly 10 wound by interposing a separator 13 between a positive electrode 11, i.e., a first electrode 11, and a negative electrode 12, i.e., a second electrode 12, a case 26 with the electrode assembly 10 mounted therein, and a cap assembly 30 coupled with an opening of the case 26.

As an example, the rechargeable battery 101 according to an exemplary embodiment may be a lithium ion secondary battery and may have a square shape. However, the present disclosure is not limited thereto. That is, the present disclosure is applicable to various types of batteries, e.g., a lithium polymer battery or a cylindrical battery.

The positive electrode 11 and the negative electrode 12 include a coating region including a current collector formed of a metal foil of a thin plate that is coated with an active material, and uncoated regions 11a and 12a including a current collector which is not coated with the active material. The positive electrode uncoated region 11a is formed at one end of the positive electrode 11 in a longitudinal direction of the positive electrode 11, and the negative uncoated region 12a is formed at an opposite end of the negative electrode 12 in a longitudinal direction of the negative electrode 12. Further, the positive electrode 11 and the negative electrode 12 are spirally wound while interposing the separator 13 being an insulator therebetween. However, the present disclosure is not limited thereto, e.g., the electrode assembly 10 may have a structure that is laminated to have a positive electrode and a negative electrode made of a plurality of sheets while interposing the separator between.

The case 26 may have a substantial cuboid shape, and an opening may be formed at one surface of the case. The case 26 may be made of a metal, e.g., aluminum and stainless steel.

The cap assembly 30 includes a cap plate 31 to cover the opening of the case 26 and a second terminal 22 which protrudes to an outer side of the cap plate 31. The second terminal extends along the outer side of the cap plate 31 toward a first terminal 21, which is electrically connected to the negative electrode 11 and an outer side of the cap plate 31.

The cap plate 31 has a plate shape which is formed long in one direction, and is coupled with the opening of the case 26. The cap plate 31 is formed therein with an electrolyte injection opening 32, and a sealing stopper 38 is formed in the electrolyte injection opening 32. Further, the cap plate 31 is formed therein with a vent hole 34 and a vent plate 39 formed therein with a notch 39a formed in the vent hole 34 to be opened at preset pressure.

The first terminal 21 and the second terminal 22 protrude to an upper portion of the cap plate 31. The first terminal 21 is electrically connected to the positive electrode 11 through the medium of a first current collecting tab 41, and the second terminal 22 is electrically connected to the negative electrode 12 through the medium of a second current collecting tab 42. However, the present disclosure is limited thereto. That is, the first terminal 21 may be electrically connected to the negative electrode 12, and the second terminal 22 may be electrically connected to the positive electrode 11.

As shown in FIG. 1 and FIG. 2, the first terminal 21 has a rectangular plate shape. The first terminal 21 is electrically connected to the positive electrode 11 through the medium of a rivet terminal 25 bonded to the current collecting tab 41. The rivet terminal 25 coupled with the first terminal 21 and the rivet terminal 25 coupled with the second terminal 22 have the same structure.

A sealing gasket 59 for sealing is inserted and installed in a hole formed through a terminal between the first terminal 21 and the cap plate 31. A lower insulator member 45 for insulating the first terminal 21 and the current collecting tab 41 from the cap plate 31 is installed under the cap plate 31.

A connecting plate 58 for electrically connecting the first terminal 21 to the cap plate 31 is installed under the first terminal 21. The rivet terminal 25 is installed through the connecting plate 58, and the connecting plate 58 is disposed between the cap plate 31 and the first terminal 21. The cap plate 31 may be electrically connected to the first terminal 21 by the above structure.

Figure 3:
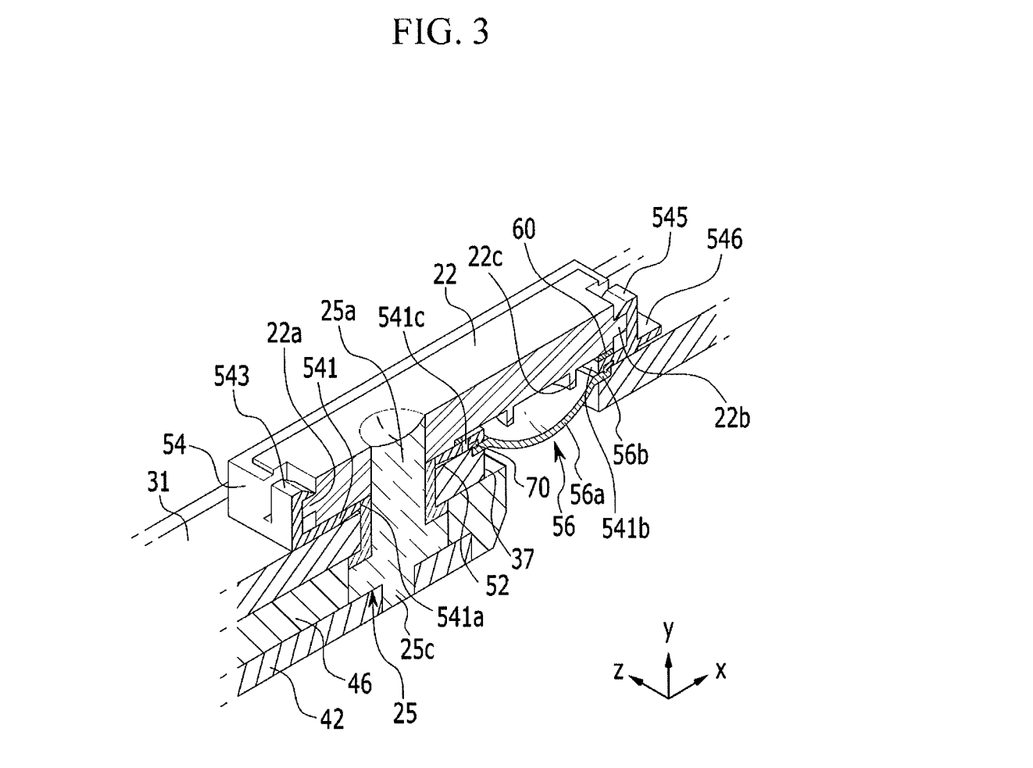
FIG. 3 illustrates a partially cut-away perspective view of a rechargeable battery according to an exemplary embodiment.

FIG. 3 is a partially cut-away, perspective view illustrating a rechargeable battery according to an exemplary embodiment.

Referring to FIG. 2 and FIG. 3, the second terminal 22 has a rectangular plate shape. The second terminal 22 is electrically connected to the negative electrode 12 through the medium of the rivet terminal 25 bonded to the current collecting tab 42. The rivet terminal 25 includes a pole part 25a extending through the cap plate 31 and through the second terminal 22 with a top end fixed to the second terminal 22, a lower flange part protruding, perpendicularly, to an outer side of the pole part 25a from a bottom end of the pole part 25a, and a lower protrusion 25c protruding downward of the bottom end of the pole part 25a and inserted and fixed in the current collecting tab 42 by welding.

A sealing gasket 55 for sealing is inserted and installed in a hole through which the terminal is formed between the second terminal 22 and the cap plate 31. A lower insulator member 46 for insulating the second terminal 22 and the current collecting cap 42 from the cap plate 31 is installed under the cap plate 31.

Meanwhile, a short circuit protrusion 22c protruding toward a short circuit hole 37 is formed under the second terminal 22. The second terminal 22 extends long in one direction to cover the short circuit hole 37. An upper insulator member 54 for insulating the second terminal 22 from the cap plate 31 is installed between the second terminal 22 and the cap plate 31.

As shown in FIG. 3, the cap assembly 30 includes a short circuit member 56 to short-circuit the positive electrode 11 with the negative electrode 12. The short circuit member 56 is electrically connected to the cap plate 31. When internal pressure of the rechargeable battery 101 is increased, the short circuit member 56 is modified, i.e., inverted toward the short circuit protrusion 22c, to be connected to the second terminal 22 via the short circuit protrusion 22c.

In detail, the cap plate 31 is formed with the short circuit hole 37 therein, and the short circuit member 56 is disposed in the short circuit hole 37 between the upper insulator member 54 and the cap plate 31. The short circuit member 56 includes a curved part 56a which is convexly bent downward to have an arc shape, and an edge part 56b formed at an outer side of the curved part 56a and fixed to the cap plate 31. The curved part 56a of the short circuit member 56 having the above structure convexly curved downward is modified to be convexly curved at a preset pressure. In this case, the short circuit protrusion 22c makes contact with the short circuit member 56.

Figure 4:
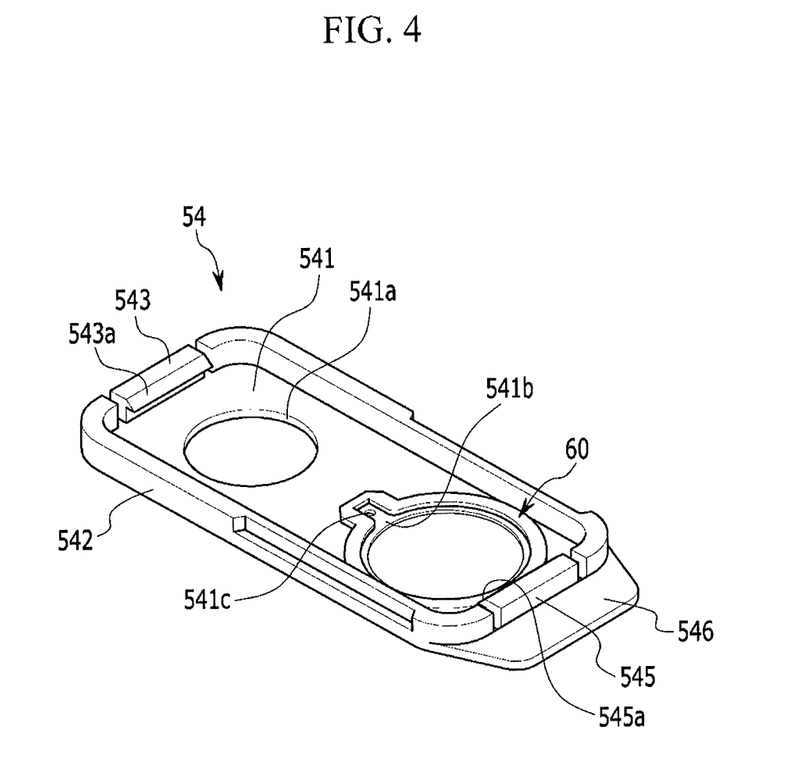
FIG. 4 illustrates a perspective view of the rechargeable battery when viewed from the top of an upper insulator member and an upper gasket according to an exemplary embodiment.
Figure 5:
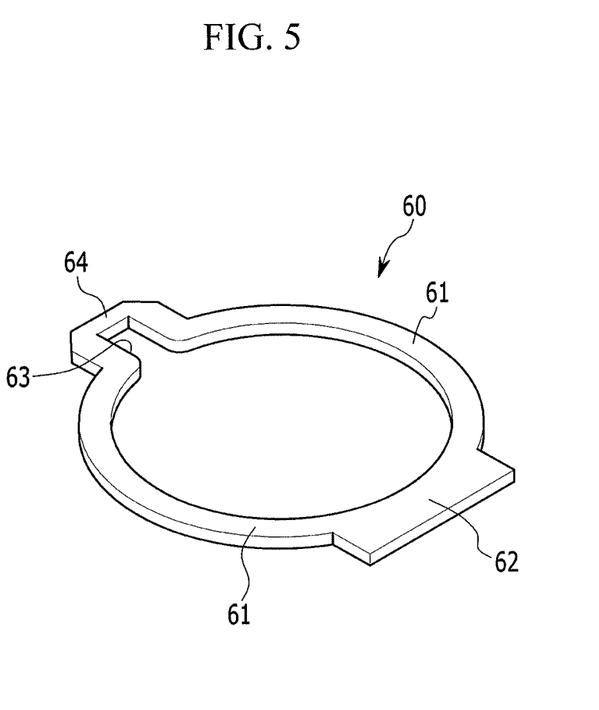
FIG. 5 illustrates a perspective view of an upper gasket according to an exemplary embodiment.

FIG. 4 is a perspective view illustrating the upper insulator member 54 and the upper gasket 60 when viewed from a top view, and FIG. 5 is a perspective view illustrating the upper gasket 60.

Referring to FIG. 4 and FIG. 5, the upper insulator member 54 includes a lower substrate 541, a sidewall 542 protruding from a side edge of the lower substrate 541, and support protrusions 543 and 545 protruding at both side edges of the longitudinal direction of the upper insulator member 54.

The lower substrate 541 has a substantially quadrangular plate shape that makes contact with a bottom surface of the second terminal 22, e.g., the lower substrate 541 is positioned between the bottom surface of the second terminal 22 and a top surface of the cap plate 31. The lower substrate 541 is formed with a terminal hole 541a therethrough, into which the rivet terminal 25 is inserted, and a connection hole 541b therethrough, which is positioned to overlap an upper portion of the short circuit hole 37 to communicate with the short circuit hole 37. The second terminal 22 is located at an upper portion of the lower substrate 541.

Further, an air hole 541c is formed between the terminal hole 541a and the connection hole 541b. The air hole 541c is disposed closer to the connection hole 541b than to the terminal hole 541a. When the short circuit member 56 is inversion-modified, e.g., inverted into the connection hole 541b, the air hole 541c serves as a path to discharge gas located at an upper space of the short circuit member 56.

The sidewall 542 is continuously formed along a side end of the lower substrate 541, and surrounds a lateral side of the second terminal 22. The support protrusions 543 and 545 support the second terminal 22 while making contact with support stages 22a and 22b, as illustrated in FIG. 3. The support stages 22a and 22b are stepped in both side ends of a longitudinal direction of the second terminal 22, and are coupled with the support protrusions 543 and 545. The support protrusions 543 and 545 include locking parts 543a and 545a (FIG. 4) which protrude toward an inner side of the lower substrate 541. When the locking portions 543a and 545a make contact with top surfaces of the support stages 22a and 22b, the support protrusions 543 and 545 support the second terminal 22.

Meanwhile, an upper gasket 60 surrounding the connection hole 541b is installed at an upper portion, i.e., upper surface, of the lower substrate 541. A lower gasket 70 surrounding the connection hole 541b is installed at a lower portion, i.e., lower surface, of the lower substrate 541, as illustrated in FIG. 3.

As shown in FIG. 3, the upper gasket 60 is installed between the second terminal 22 and the upper insulator member 54. As shown in FIG. 4 and FIG. 5, the upper gasket 60 surrounds an upper space of the connection hole 541b and an upper space of the air hole 541c at the upper portion of the connection hole 541b, e.g., the upper gasket 60 extends on the upper surface of the lower substrate 541 to completely surround the connection hole 541b and the air hole 541c in a single closed-shaped frame.

Referring to FIG. 5, the upper gasket 60 includes two upper sealing parts 61 to partially surround a circumference of the connection hole 541b, a support plate 62 extending from one end of the upper sealing part 61 to an outer side, and a connection sealing part 64 protruding to an outer side between spaced upper sealing parts 61 to surround the air hole 641c.

The upper sealing part 61 has a band shape which is continuously formed to have an arc shape. One end of the upper sealing part 61 is spaced apart to be connected to the connection sealing part 64. The connection sealing part 64 is connected to the one end of the upper sealing part 61, and protrudes toward the air hole 541c at the upper sealing part 61 to surround the air hole 541c. Accordingly, a passage 63 communicating with the air hole 541c and an internal space of the upper sealing part 61 is formed at an inner side of the connection sealing part 64.

The support plate 62 is connected to an opposite end of the upper sealing part 61, and prevents the upper gasket 60 from being modified and supports pressure applied to the upper gasket 60. In this way, if the connection sealing part 64 is connected with the upper sealing part 61, even if the upper gasket 60 is installed, the connection hole 541b may communicate with the air hole 541c. Accordingly, when the short circuit member 56 is conversion-modified, e.g., inverted upward into the connection hole 541b, gas located above the upper space of the short circuit member 56 may be moved downward through the air hole 541c. That is, if the short circuit member 56 is convexly modified upward, an upper space of the short circuit member 56, i.e., a space between the upwardly inverted short circuit member 56 and the second terminal 22, decreases, so that pressure in the upper space of the short circuit member 56 is increased. If the gas located in the upper space of the short circuit member 56 is not moved to another position, internal pressure of the case 26 is increased, so the short circuit member 56 is not inverted.

However, as in the present exemplary embodiment, if the upper gasket 60 simultaneously surrounds the connection hole 541b and the air hole 541c, since the gas may be moved through the air hole 541c, the short circuit member 56 may be easily modified at a preset pressure.

Figure 6:
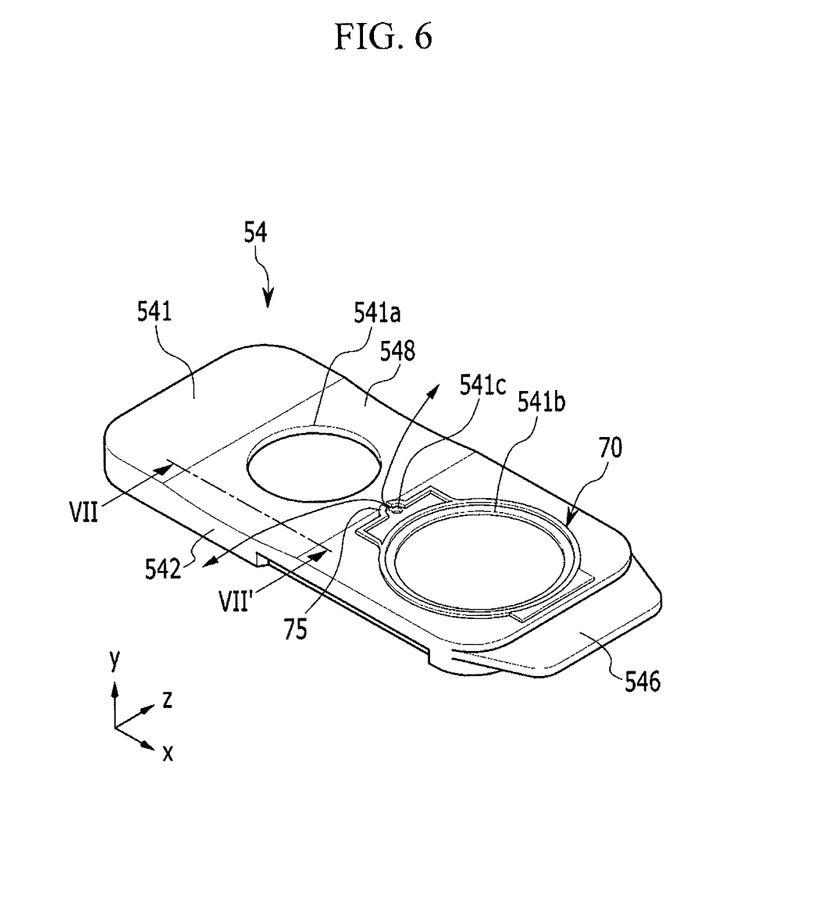
FIG. 6 illustrates a perspective view of an upper insulator member and a lower gasket according to an exemplary embodiment.
Figure 7:
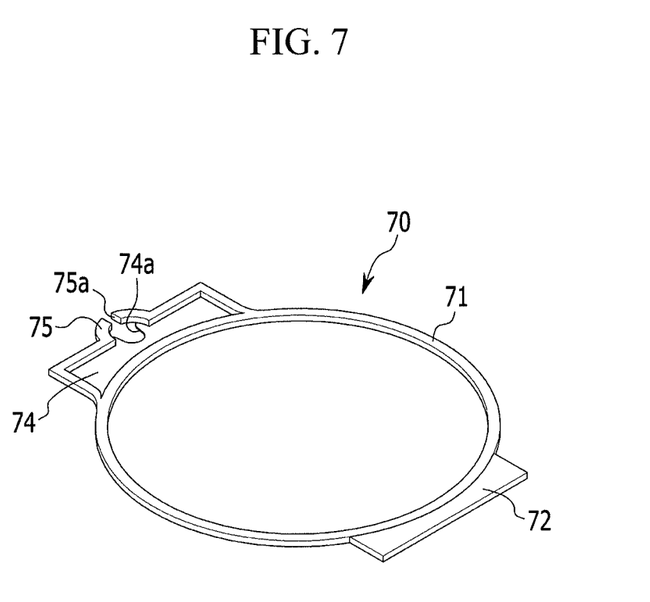
FIG. 7 illustrates a perspective view of the lower gasket according to an exemplary embodiment.
Figure 8:
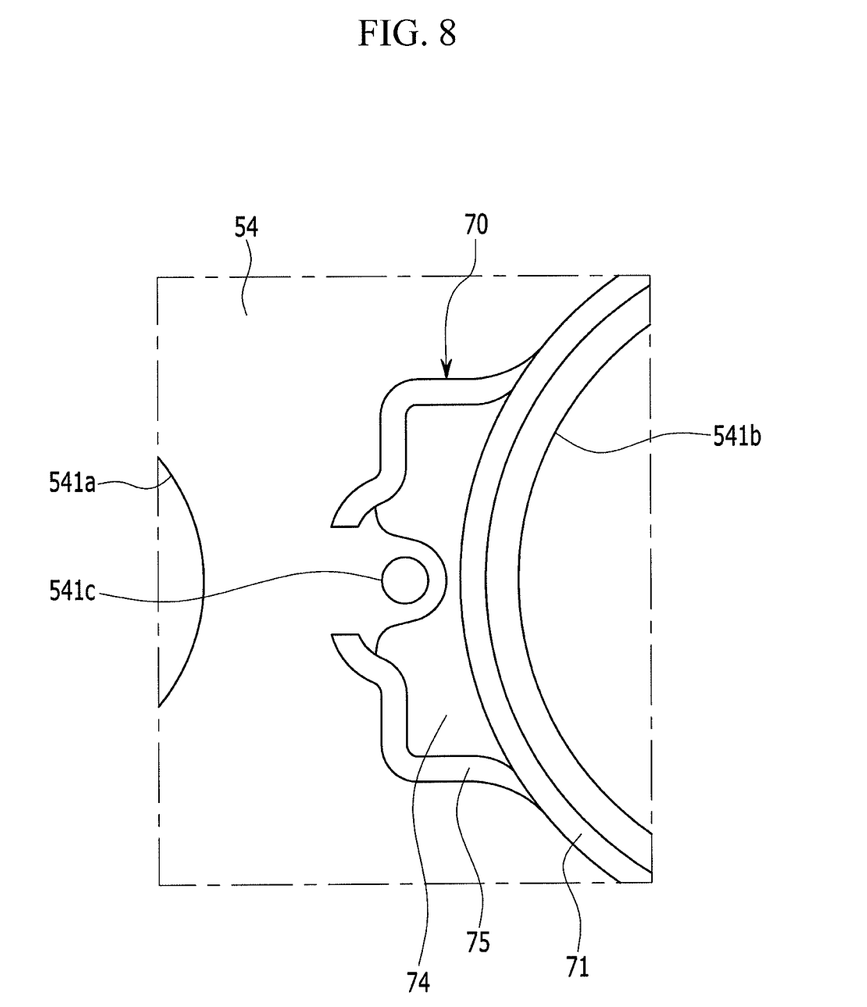
FIG. 8 illustrates a partial plan view of an upper insulator member and the lower gasket according to an exemplary embodiment.

FIG. 6 is a perspective view illustrating the upper insulator member 54 and the lower gasket 70 when viewed from a bottom view, FIG. 7 is a perspective view illustrating the lower gasket 70, and FIG. 8 is a partial enlarged view illustrating the upper insulator member 54 and the lower gasket 70 in plan view.

Referring to FIGS. 3 and 6-8, the lower gasket 70 is disposed between the upper insulator member 54 and the short circuit member 56, so a portion of the upper insulator member 54 may be between the upper and lower gaskets 60 and 70 (FIG. 3). As illustrated in FIG. 6, the lower gasket 70 surrounds a lower portion of the connection hole 541b at a lower portion of the connection hole 541b. The lower gasket 70 includes a lower sealing part 71 to surround a circumference of the connection hole 541b, a support plate 72 protruding from a lateral side of the lower sealing part 71, and a guide protrusion 75 protruding to the air hole 541c from an outer side of the lower sealing part 71.

Referring to FIGS. 6-8, the lower sealing 71 has a ring shape to surround the entire lower circumference of the connection hole 541b. Accordingly, the lower sealing part 71 may prevent the lower space of the connection hole 541b from communicating with the lower space of the air hole 541c.

Two guide protrusions 75 protrude toward the air hole 541c in the lower sealing part 71 to surround the air hole 541c. A spaced opening 75a is formed between the guide protrusions 75 so that the gas may be discharged. Further, a guide plate 74 bonded to the guide protrusion 75 and the lower sealing part 71 is formed at an inner side of the guide protrusion 75, and the guide plate 74 is formed therein with a guide hole 74a communicating with the air hole 541c. The guide plate 74 is formed as a thinner plate than the guide protrusion 75. The support plate 72 is connected to a lateral side of the lower sealing part 71 to prevent the lower gasket 70 from being modified and to support pressure applied to the lower gasket 70.

If the lower sealing part 71 and the guide protrusion 75 having the above structure are formed, since the lower space of the connection hole 541b and the lower space of the air hole 541c are blocked, the gas moved downward from a top portion of the short circuit member 56 through the air hole 541c may be discharged between guide protrusions 75.

Figure 9:
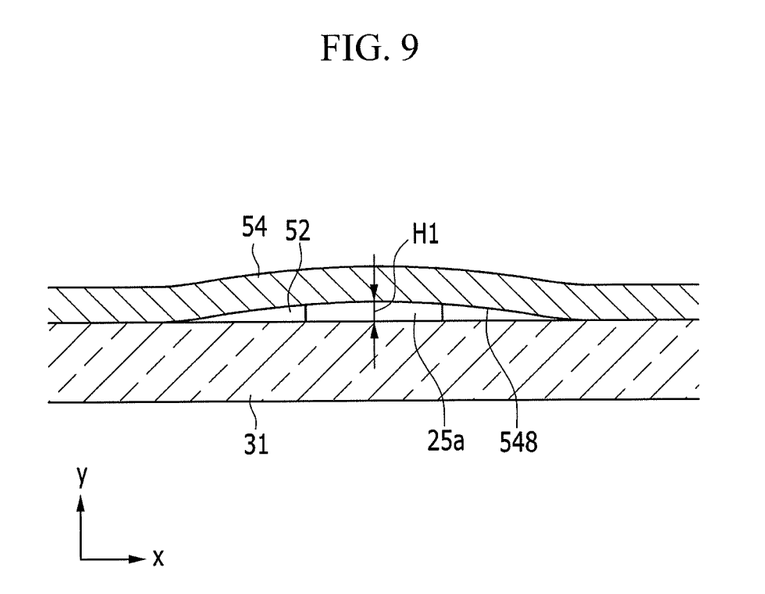
FIG. 9 illustrates a cross-sectional view of the upper insulator member and a cap plate along line VII-VII' of FIG. 6.

FIG. 9 is a cross-sectional view of the upper insulator member 54 and the cap plate 31 along line VII-VII' of FIG. 6.

Referring to FIG. 6 and FIG. 9, the upper insulator member 54 is formed with an exhaust groove 548 therein, and the exhaust groove 548 is formed at a plane facing toward the cap plate 31 from the upper insulation member 54. For example, as illustrated in FIG. 9, the lower surface of the upper insulation member 54 facing the cap plate 31 may be curved away from the cap plate 31 to define the exhaust groove 548. For example, the exhaust groove 548 is curved to have an arc shape, so a gap 52 may be formed between the curved surface of the upper insulator member 54, i.e., the exhaust groove 548, and the upper surface of the cap plate 31.

Referring to FIG. 6, the exhaust groove 548 is continuously formed from one end of the upper insulator member 54 to an opposite end thereof, and has a longitudinal cross-section. The exhaust groove 548 is continuously formed from the connection hole 541b in a direction toward the terminal hole 541a, and is spaced apart from the connection hole 541b and is connected to the terminal hole 541a. For example, as illustrated in FIG. 6, the exhaust groove 548 continuously extends in the xz-plane from an outermost edge of the guide protrusions 75 of the lower gasket 70 to a predetermined distance beyond the terminal hole 541a. The exhaust groove 548 may surround the whole lower portion of the terminal hole 541a, as viewed in top view (FIG. 6).

The gap 52 is continuously formed from the connection hole 541b in the direction facing toward the terminal hole 541a. For example, as illustrated in FIG. 9, the gap 52 overlaps, e.g., completely overlaps, the exhaust groove 548, and may have a varying height. A maximum height H1 of the gap 52 may be in the range of about 0.5 mm to about 2 mm. Since the exhaust groove 548 extends from the outermost edge of the guide protrusions 75, the gap 52 is connected to the air hole 541c through the medium of the opening 75a at the guide protrusions 75. Therefore, the gas discharged between the guide protrusions 75 may be discharged to the outside through the gap 52. Accordingly, in the exemplary embodiment, sealing performance between the upper insulator member 54 and the short circuit member 56 may be improved, and the gas located at an upper portion of the connection hole 541c may be discharged through the air hole 541c and the gap 52.

Figure 10:
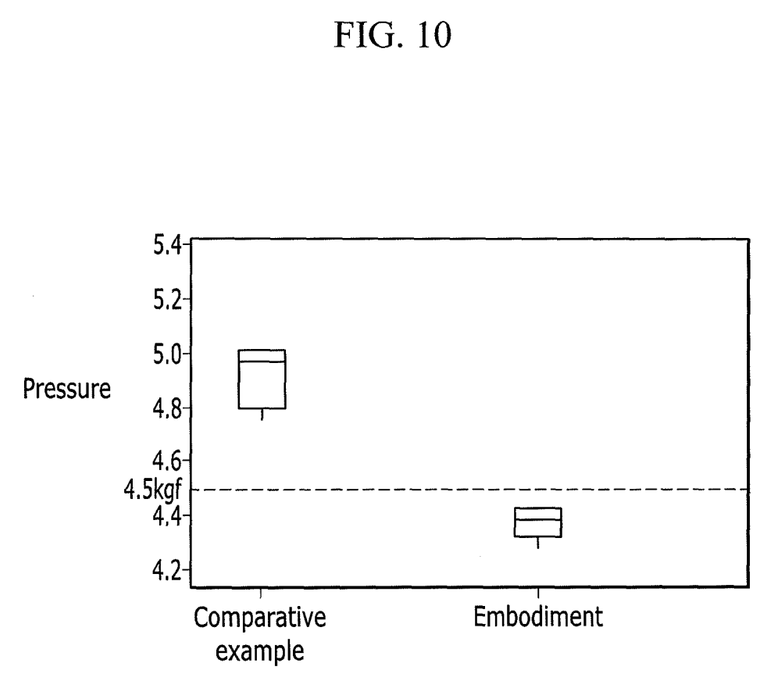
FIG. 10 illustrates a graph of modified pressure distribution of a comparative short circuit member and modified pressure distribution of a short circuit member according to an exemplary embodiment.

FIG. 10 is a graph illustrating modified pressure distribution of a comparative short circuit member, and modified pressure distribution of a short circuit member according to an exemplary embodiment. As shown in FIG. 10, in the comparative rechargeable battery, modified pressure of the short circuit member is non-uniform and the rechargeable battery is modified at a higher pressure than a preset pressure. However, the rechargeable battery 101 according to an exemplary embodiment has small distribution of the modified pressure and is modified within preset pressure.

By way of summation and review, if internal pressure of a conventional rechargeable battery made of a rigid material, e.g., metal, is increased, the rechargeable battery explodes or combusts. In contrast, example embodiments provide a rechargeable battery having an upper insulator member with an exhaust groove that improves safety. That is, in an exemplary embodiment, when the short circuit member is inverted, since gas is discharged through a gap defined by the exhaust groove, the short circuit member may be easily inverted at a preset pressure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
    an electrode assembly including a first electrode and a second electrode;
    a case to receive the electrode assembly;
    a cap plate coupled with the case and including a short circuit hole;
    a first terminal electrically connected to the first electrode;
    a second terminal electrically connected to the second electrode;

an upper insulator member disposed between the second terminal and the cap plate, the upper insulator member including:
a connection hole communicating with the short circuit hole, and
a terminal hole spaced apart from the connection hole;
a short circuit member in the short circuit hole to electrically connect the cap plate with the second terminal when the short circuit member is modified; and
a gap between the upper insulator member and the cap plate, the gap extending continuously from the connection hole toward the terminal hole, and the gap being in fluid communication with the terminal hole but is not in fluid communication with the connection hole.

2. The rechargeable battery as claimed in claim 1, wherein the upper insulator member further comprises an exhaust groove in a surface facing the cap plate, the gap being defined between the exhaust groove and the cap plate.

3. The rechargeable battery as claimed in claim 2, wherein the exhaust groove is spaced apart from the connection hole and is connected to the terminal hole.

4. The rechargeable battery as claimed in claim 2, wherein the exhaust groove is curved to have an arc shape.

5. The rechargeable battery as claimed in claim 2, wherein the exhaust groove continuously extends from one end of the upper insulation member to an opposite end of the upper insulator member.

6. The rechargeable battery as claimed in claim 1, wherein the gap has a maximum height in a range of about 0.5 mm to about 2 mm.

7. The rechargeable battery as claimed in claim 1, further comprising a first terminal electrically connected to the first electrode and protruding to an outer side of the cap plate, the first terminal being electrically connected to a cap plate through a connecting plate, and the short circuit member being electrically connected to the first terminal through the cap plate.

8. The rechargeable battery as claimed in claim 1, wherein the short circuit member includes:
a curve part which is convexly bent downward; and
an edge part at an outer side of the curve part.

9. A rechargeable battery, comprising:
an electrode assembly including a first electrode and a second electrode;
a case to receive the electrode assembly;
a cap plate coupled with the case and including a short circuit hole;
a first terminal electrically connected to the first electrode;
a second terminal electrically connected to the second electrode;
an upper insulator member disposed between the second terminal and the cap plate, the upper insulator member including:
a connection hole communicating with the short circuit hole, and
a terminal hole spaced apart from the connection hole;
a short circuit member in the short circuit hole to electrically connect the cap plate with the second terminal when the short circuit member is modified; and
a gap between the upper insulator member and the cap plate, the gap extending continuously from the connection hole toward the terminal hole,
wherein the upper insulator member further comprises an air hole spaced apart from the connection hole, the gap being in fluid communication with the air hole.

10. The rechargeable battery as claimed in claim 9, further comprising an upper gasket between the upper insulator member and the second terminal, the upper gasket simultaneously surrounding a top end of the air hole and a top end of the connection hole.

11. The rechargeable battery as claimed in claim 10, wherein the upper gasket includes:
an upper sealing part to partially surround a circumference of the connection hole; and
a connection sealing part with two ends connected to the upper sealing part, and protruding toward the air hole to surround a circumference of the air hole.

12. The rechargeable battery as claimed in claim 11, wherein the upper gasket further comprises a support plate extending to an outer side of the upper gasket and connected to the upper sealing part, the support plate protruding in a direction opposite to a direction toward the connection sealing part.

13. The rechargeable battery as claimed in claim 10, further comprising a lower gasket between the upper insulator member and the short circuit member, the lower gasket surrounding the connection hole.

14. The rechargeable battery as claimed in claim 13, wherein the lower gasket includes a lower sealing part having a ring shape, the lower sealing part surrounding the connection hole to block communication between the connection hole and the air hole.

15. The rechargeable battery as claimed in claim 14, wherein the lower gasket includes a guide protrusion protruding toward the air hole from the lower sealing part, and the guide protrusion partially surrounds the air hole.

16. The rechargeable battery as claimed in claim 15, wherein the lower gasket further comprises a guide plate bonded to the guide protrusion, the lower sealing part being at an inner side of the guide protrusion, and the guide plate including a guide hole in fluid communication with the air hole.

17. The rechargeable battery as claimed in claim 14, wherein the lower gasket further comprises a support plate at an outer side thereof and connected to a lateral side of the lower sealing part.

* * * * *